3,352,915
PROCESS FOR THE PREPARATION OF NITROGEN- AND FLUORINE-CONTAINING ETHERS
William H. Graham, Huntsville, Ala., assignor to Rohm & Haas Company, Philadelphia, Pa., a corporation of Delaware
No Drawing. Filed Mar. 19, 1963, Ser. No. 268,510
4 Claims. (Cl. 260—584)

This invention concerns a method of preparation of bis(difluoramino)dimethyl ether and more particularly it concerns the preparation of bis(difluoramino)dimethyl ether by the reaction of difluoraminomethanol with concentrated sulfuric acid. Of all the processes which have been investigated for the preparation of bis(difluoramino) dimethyl ether, this process has consistently given higher yields of higher purity product.

The product of this invention, bis(difluoramino)dimethyl ether, is of interest as a storable monopropellant and has a calculated specific impulse of 300. The compound can also be used as an oxidizer in propellant formulations.

The starting material, difluoraminomethanol, is prepared by reacting paraformaldehyde with difluoramine, $HNF_2$, preferably by heating the mixture at elevated temperatures. Thus, although the reaction will proceed at room temperature, the temperature range preferred is 140° C. to 160° C. The reaction time at this temperature was two hours. The product was identified by infrared, nuclear magnetic resonance and mass spectrum analyses. The values from these tests were identical with those of an authentic sample of difluoraminomethanol prepared by a different process, and identified as such by elemental analyses.

Concentrated sulfuric, i.e. approximately 100% $H_2SO_4$, is employed as the other reactant, and a standard procedure is to place the concentrated sulfuric in a flask, evacuate the flask, immerse the flask in a bath at —60° to —90° C. and condense the difluoraminomethanol into this bath. With stirring, the mixture is allowed to warm to room temperature, the stirring being continued for 30 minutes to two hours. At the end of this time, the flask is evacuated through a train of two cold traps at —80° C. and —130° C. The product, bis(difluoramino)dimethyl ether was contained in the —80° C. trap.

Large excesses of sulfuric acid are employed, as high as 20 parts by weight of 100% sulfuric per one part by weight of difluoraminomethanol. While it is possible to use lower ratios of sulfuric acid to difluoraminomethanol, high ratios such as shown insure maximum utilization of difluoraminomethanol. Inasmuch as sulfuric acid is inexpensive and particularly since no part of it appears in the finished product, the use of large excesses gives maximum utilization of the much more expensive difluoraminomethanol.

The following examples set forth certain well-defined embodiments of the application of this invention. They are not, however, to be considered as limitations thereof, since many modifications may be made without departing from the spirit and scope of this invention. Unless otherwise specified, all parts are parts by weight. All temperatures are centigrade unless otherwise noted.

EXAMPLE

*Bis(difluoramino)dimethyl ether*

Into an evacuated 120 ml. U-tube containing 10 ml. of 100% $H_2SO_4$ was condensed about 1.0 grams difluoraminomethanol by means of a —80° C. cold bath. The mixture was allowed to warm to room temperature and was stirred for one hour by means of a small magnetic stirring bar.

The U-tube was then opened to a train of two cold traps at —80° C. and —130° C.; the contents were pulled on under vacuum for 30 minutes. The —80° C. trap held 0.9 grams of bis(difluoramino)dimethyl ether of good purity. The product was identified by comparison of its physical properties, particularly the mass, infrared and proton and fluorine resonance spectra with those of authentic samples prepared by other methods and clearly identified by elemental analyses.

I claim:
1. A process for the preparation of bis(difluoramino) dimethyl ether which comprises reacting difluoraminomethanol with concentrated sulfuric acid.
2. A process as set forth in claim 1 in which the concentrated sulfuric acid is 100% $H_2SO_4$.
3. The process as set forth in claim 1 in which the reaction is conducted at ambient temperatures.
4. The process as set forth in claim 2 in which the ratio of 100% $H_2SO_4$ to difluoraminomethanol is about 20 parts by weight to 1 part by weight.

References Cited

UNITED STATES PATENTS 3,103,456    9/1963    Lawton et al. _____ 149—1

CHARLES B. PARKER, *Primary Examiner*.